United States Patent
Valdes

[15] 3,696,631
[45] Oct. 10, 1972

[54] INTEGRATED MODULAR REFRIGERATION SYSTEM
[72] Inventor: Pelayo F. Valdes, 4504 W. Idelwild, Tampa, Fla. 33614
[22] Filed: Dec. 9, 1970
[21] Appl. No.: 96,483

[52] U.S. Cl. ...................62/282, 62/240, 62/298, 62/375, 62/448
[51] Int. Cl. ...........................................F25d 21/10
[58] Field of Search......62/62, 63, 64, 237, 373, 374, 62/375, 376, 378, 380, 438, 302, 298, 282, 448, 449, 450

[56] References Cited

UNITED STATES PATENTS

| | | | |
|---|---|---|---|
| 3,435,630 | 4/1969 | Ferry | 62/374 X |
| 2,746,272 | 5/1956 | Carpenter | 62/373 X |
| 2,982,109 | 5/1961 | Puretic | 62/376 X |
| 3,162,020 | 12/1964 | Beckmann | 62/376 X |
| 3,498,069 | 3/1970 | Waldin | 62/63 |
| 2,968,933 | 1/1961 | Pfeifer et al. | 62/298 X |
| 3,323,625 | 6/1967 | Webster | 62/302 X |

*Primary Examiner*—Meyer Perlin
*Assistant Examiner*—Ronald C. Capossela
*Attorney*—Stefan M. Stein

[57] ABSTRACT

This device relates to a modular refrigeration apparatus which is adapted to be attached to the deck of a fishing vessel and to not only quick freeze the comestibles placed within but to keep the hold at a low temperature. The apparatus consists of three separate modules which may be used remotely from each other.

12 Claims, 5 Drawing Figures

PATENTED OCT 10 1972

INVENTOR.
PELAYO F. VALDES
BY
Stefan M. Stein
ATTORNEY.

INVENTOR.
PELAYO F. VALDES
BY Stefan M. Stein
ATTORNEY.

INTEGRATED MODULAR REFRIGERATION SYSTEM

This invention relates generally to quick freeze refrigeration apparatus which is adapted for use aboard ship for freezing shrimp, fish and the like and which is particularly designed to consist of modular units adapted to be functionally attached together with an insulated framework. The apparatus is designed to be attached to the deck of a ship and provide communication between the deck and cold storage hold. The unit is further designed to be attached to any convenient part of the deck with only slight modification and the unit will not cover or occlude any existing hatchways.

Large scale shrimping operations are carried out by trawling boats which stay out collecting shrimp until they get a full load. The period of time these trawlers spend out of port depends upon the luck of the catch and the distance that must be traveled to the shrimping grounds. In the past, shrimp trawlers were forced to stay relatively close to a port with a processing plant because of the tendency of shrimp to deteriorate rapidly. In order to slow down this deterioration, ice is used to cool the catch. The general practice has been to place the ice and shrimp in layers into some sort of container such as a barrel. Along with the waste of time and manpower which is inherent in an operation of this type, the weight of the ice and storage space required for an extended trip makes the cost of this method prohibitive, especially in view of the fact that ice is not very effective as a preservative. It has been found that although ice tends to slow down the deterioration of the shrimp the bacteria count per unit time rises rapidly with cooled, but not frozen, shrimp. Further, just cooling and not freezing shrimp tends to make the shrimp bodies soft and hence subject to be easily damaged during storage at the bottom of a barrel, or during unloading and handling before processing. Because of this easy spoiling tendency it is not unusual for a trawler to have 5–10 percent of its catch rot by the time the shrimp reach the processing plant. In addition to rotted shrimp another problem is the tendency of shrimp to develop "black spot." This discoloration on the body of the shrimp does not effect the edibility of the shrimp but, because of the appearance of shrimp affected with "black spot" they are practically worthless in the consumer market. This discoloration of the shrimp is caused by an enzyme action which is slowed down but not stopped by cooling the shrimp with ice. In order to stop this action even further, it is necessary to quick freeze the shrimp.

It is desirable then, in view of the above, to do away with icing as the preserving medium and replacing it with some sort of mechanical refrigeration system. Several mechanical refrigeration systems have been developed but most of them are too costly and complex to justify being used on the small shrimp trawler. For instance, in one prior art system, the shrimp are placed through a loading hatch into one or more storage tanks in the hold. Brine is then circulated by pumps, and then siphoned off when the trawler reaches port. As can be seen, this calls for complex structural modification of the trawler and would be too expensive and complex for the small boat.

Presently, there are numerous different types of quick freeze refrigeration apparatus available, however, all are generally unsatisfactory for use aboard fishing boats, for one reason or another. For example, see U. S. Pat. No. 1,912,896 to Hiller. The apparatus of this patent employs freezing sea water and a plurality of brine tanks so arranged that the freezing brine of any one tank after its use has been discontinued may be utilized to partially cool the brine being introduced in any other tank. It is readily apparent that this apparatus is generally inefficient and, furthermore requires a complex, bulky, substantially permanent installation. Accordingly, it objectionable for a number of different reasons.

In U. S. Pat. No. 2,059,970 to Robillard, quick freeze refrigeration apparatus is disclosed wherein the shrimp or fish are rapidly cooled and frozen by contacting them directly with a volatile liquid refrigerant which is vaporized, recondensed, recovered and used over again. A continuous belt conveyor is used to transport the shrimp and fish through the volatile liquid. In viewing the drawings of the subject apparatus, it is apparent that it is far more complex, bulkier and more difficult to install than the above-described Hiller apparatus.

Still additional quick freeze apparatus is disclosed in U. S. Pat. No. 2,077,607 to Wood. With this apparatus, the articles are frozen by a flow, blast or accelerated current of air or other aeriform fluid reduced to a temperature not higher than zero Fahrenheit. The apparatus generally is not adapted for shipboard use.

U. S. Pat. No. 2,513,004 discloses a ship's hull construction having a large number of compartments or containers in which shrimp or fish are retained. A refrigerant is circulated around the compartments or containers in conductive contact with the shrimp or fish. Similar large, complex installations in ships are disclosed in U. S. Pat. Nos. 2,746,272, 2,909,040, 3,049,890 and 3,261,176.

Still other types of quick freeze refrigeration are available which use a solution of salt and syrup to quick freeze the shrimp or fish. In most cases, the apparatus has a construction such that the solution can spill out of it, generally on the crew or deck. This is not only messy and presents a safety hazard, it also is a waste of solution. Others use baskets which must be lifted in and out of the tank in which the solution is retained and/or have heavy lids to open and close. This type of apparatus is very inconvenient and its operation is time consuming. In addition, they are very dangerous since it is extremely difficult to handle the baskets and the heavy lids in a rolling sea. Such arrangements have cost more than one man his fingers and hands. Still other apparatus is complex in operation and/or requires considerable deck space for its installation which, in many cases, is further objectionable because it is a permanent or semi-permanent installation.

An object of the present invention is to provide improved quick freeze refrigeration apparatus.

Another object is to provide a quick freeze system which consists of a series of modules which are adapted to be separately replaced, quickly, if one fails.

Still another object is to provide improved quick freeze refrigeration apparatus of the above character which is particularly adapted for use aboard fishing boats.

A further object is to provide improved apparatus of the above character which can easily be affixed over a special hatch of a fishing boat.

A still further object is to provide improved apparatus of the above character which has a construction such that the solution therein is prevented from slopping out of it.

Another object is to provide apparatus of the above character which does not require the handling of baskets in and out of a tank.

Another object is to provide apparatus of the above character which is of a construction so as to save deck space.

Another object is to provide apparatus of the above character which is further adapted to refrigerate the hold of a fishing boat.

Another object is to provide apparatus of the above character which is relatively simple in construction and requires little maintenance.

Other objects of the invention will in part be obvious and will in part appear hereinafter.

The foregoing and other objects of the invention not specifically enumerated are accomplished by providing a quick freeze refrigeration apparatus which is of modular construction that is adapted to fit over a special hole or hatch on the deck of a fishing trawler. The apparatus is of a compartmental design wherein some compartments are covered by integral insulation. The individual modules are placed in a frame imbedded in the deck of a trawler and adapted to be removed and replaced with ease in the event of a break down of one units. The various modules comprise a first module including cooling coils and blower, a second module including a quick freezing means and conveyor, and a third module including a compressor and motor.

In operation, the compressor and motor circulates cooling fluid in a series of coils located in the quick freezing and conveyor module. The quick freezing and conveyor module comprises a freeze solution, a pump to circulate the freeze solution around the cooling coils and a conveyor to remove the frozen shrimp from the module and place them into the cold storage hold of the vessel. The cooling coil and blower module is the section of the unit concerned with keeping the cold storage hold at a low temperature. The cooling fluid from the compressors is run through a series of coils and the associated blowers are adapted to withdraw air from the hold, pass it over the coils and reinfect the colder air. Further there are associated with this module doors that when opened will draw air from the outside and insert this warm air into the hold thereby aiding in defrosting of the unit.

In a modular unit of this type the modules need not physically abut each other but may each be placed at different locations depending upon the design of the trawler. For instance, all the ship builder needs is the frame for the particular configuration of refrigeration unit that will be used on the trawler. After completion of the vessel the modular unit merely needs to be placed in the frame and connected.

These refrigeration units are designed to freeze the shrimp catch of the trawler from 80 to 100 feet and to keep the holds, which are up to 3000 cubic feet, cold for protracted period of time. These units are very large, here, all three modules are approximately 8 by 8 by 5 feet and weigh several thousand pounds. Because of their size there has been a problem in shipping these units from the point of manufacture to the sight where the unit is being built into the trawler. This modular design not only allows the ship designer to place the parts of the unit more efficiently, but the individual units are much easier to ship and to handle.

The invention accordingly comprises the features of construction, combination of elements and arrangement of parts which will be exemplified in the construction hereinafter set forth and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawing.

Figure 1:
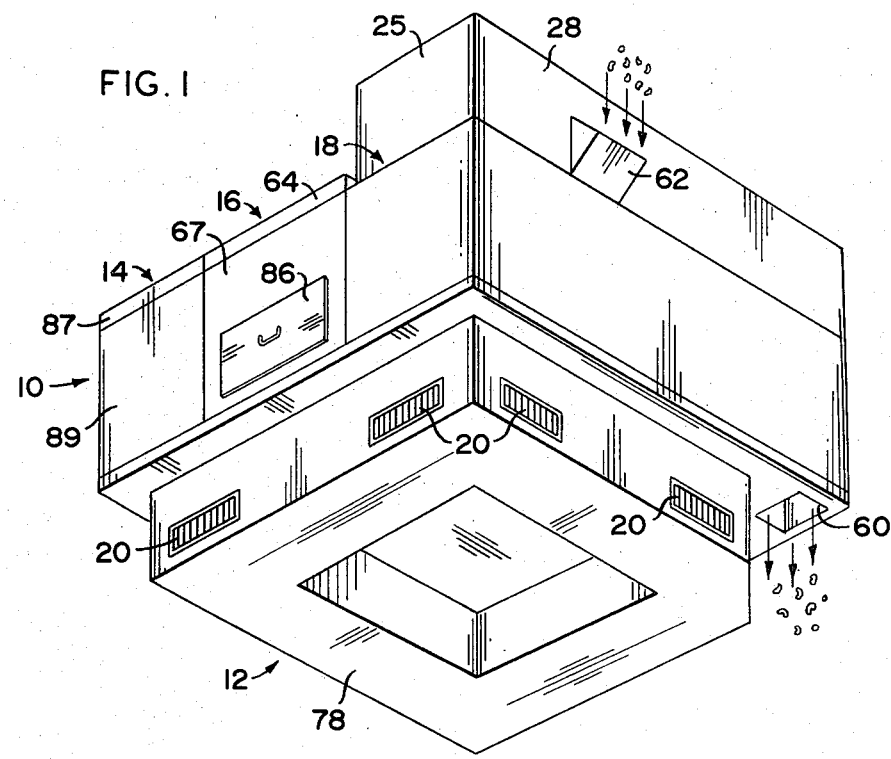
FIG. 1 is a bottom perspective view of the modular unit.
Figure 5:
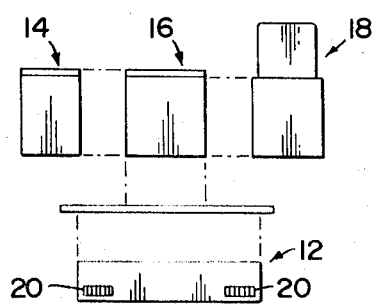
FIG. 5 is a frontal exploded view of the modular unit.

Referring now to the drawings, in FIG. 1 there is shown a perspective bottom view of the modular quick freeze apparatus 10 which is designed to be built or installed into the deck of a shrimp trawler. As shown in FIG. 5, the frame 12 is separate from modules 14, 16 and 18 and is adapted to be placed in the deck of the ship during or after construction. The cool air exhaust louvres 20 or doors (not shown) are shown on the bottom of the frame. These louvres or doors provide communication between the cold storage hold of the vessel and the cooling coils and blower module 16 and can be selectively operated individually or in combination.

Figure 2:
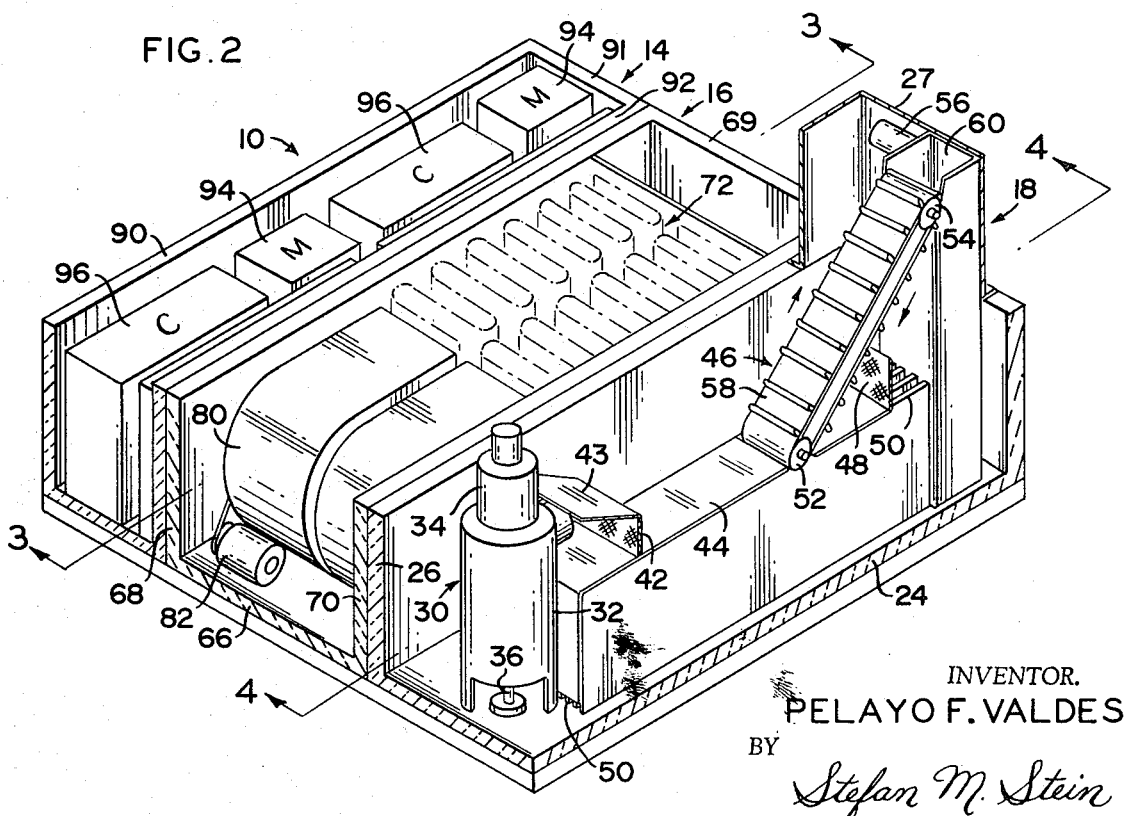
FIG. 2 is a top perspective view of the modular unit without the top and side walls.
Figure 4:
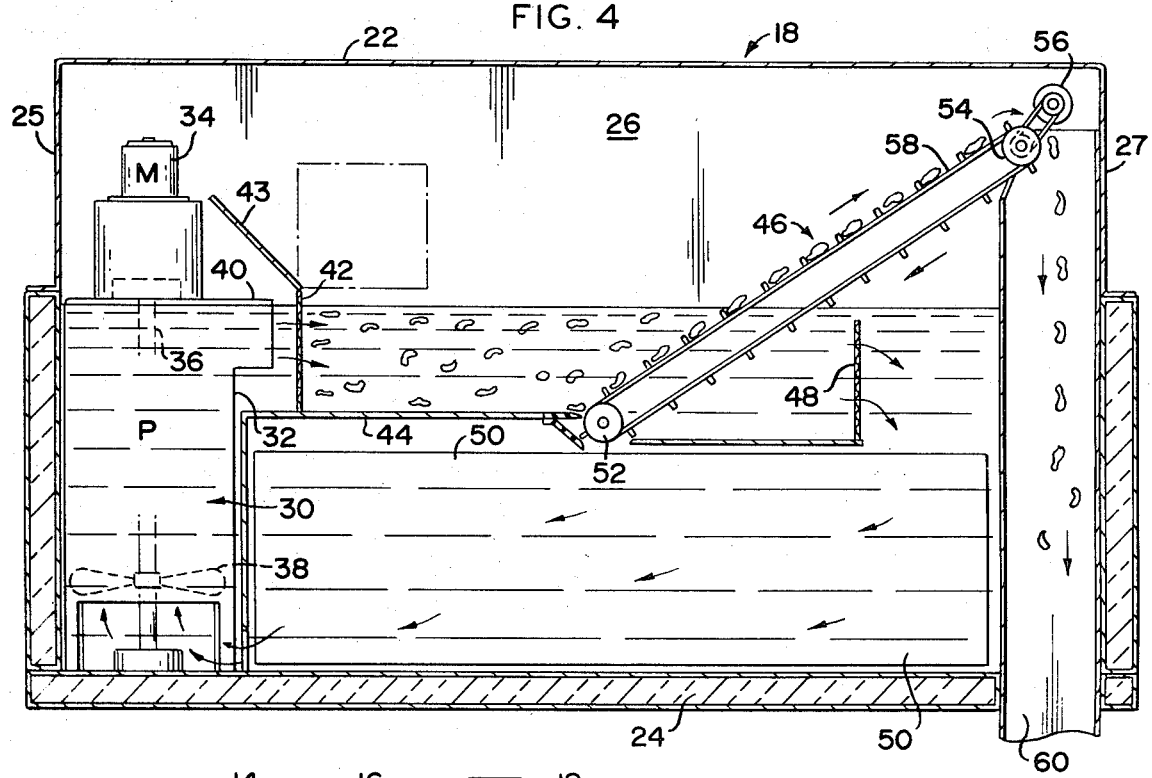
FIG. 4 is a cross-sectional view along line 4–4 of FIG. 2.

More specifically, the quick freezing module 18 is substantially rectangular shaped with a top wall 22, a bottom wall 24, and side walls 25–28 so as to provide a container through which the freeze solution can flow. Referring to FIGS. 2 and 4, within the quick freeze module 18, is shown a lift pump 30 consisting of a lift tube 32 which is open at the bottom and the top end. A motor 34 drives a shaft 36 and an impeller blade 38 within lift tube 32. A spill tray 40 is attached to the open top portion of the lift tube 32 and is adapted to spill the freeze solution through filter screen 42 and into the quick freeze area. Screen 42 acts to prevent any of the comestibles in the quick freeze area from backing up into the lift pump mechanism. The quick freeze area of module 18 is defined by screen 42, side walls 26 and 28, a cooling plate cover 44 and the conveyor belt 58. A second filter screen 48 is also provided to catch any shrimp pieces that may pass conveyor 46. Beneath cooling plate cover 44 are located a plurality of cooling plates 50 in a fixed, spaced, parallel relation to each other. The cooling plates are coupled to a compressor module, discussed below, and are cooled by the circulation of a cooling fluid within each of the cooling plates. An endless conveyor 46 is also located within the freezing module 18. The conveyor is rotatably supported on a pair of rollers. Roller 54 has a motor 56 affixed to it for rotatably driving the roller 54 and the belt 58 of the conveyor 46. Belt 58 is preferably made of mesh of some type that will pass liquid but will retain the shrimp. Conveyor 46 is angularly disposed to and partially submerged in the brine, freeze solution and functions to lift the frozen shrimp out of the brine and deposit the shrimp into a drop chute 60 which is positioned to spill the frozen shrimp into the cold storage hold of the shrimp trawler. The freeze solution in the module 18 is preferably a solution of corn syrup, salt and water which has been found to be exceptionally satisfactory to quick freeze shrimp placed within module 18 through a suitable intake chute such as shown by chute 62 in FIG. 1. Other solutions, however, can be used and for the purpose of the invention, it is only necessary that an appropriate solution for freezing the shrimp be contained within the module 18. The temperature of the solution is thermostatically controlled to prevent the solution from freezing up and seperating. The coils keep the solution cooled to approximately minus 10° or 12° F. Heat transfer is designed to provide a freeze production rate of 500 lb/hr. On a continuous basis. Circulation of the solution is established and maintained by the lift pump 30 which lifts the solution from the bottom of module 18 and forces it out over spill tray 40, through screen 42, conveyor web 46, second filter screed 48 and around the parallel, spaced, cooling plates 50, as the solution flows around cooling plates 50 the heat picked up by the circuitous travel is dissipated into the plates. In use, the shrimp are dumped into intake chute 62 and spill into the freeze solution. Deflector 43 is provided to insure none of the shrimp fall into the motor workings of lift pump 30. The circulation of the solution keeps cold solution in constant contact with the shrimp and also moves the freezing shrimp to the right. The shrimp are retained within this freezing compartment until frozen which generally takes about 10 minutes. When the shrimp are frozen they will rise to the top of the brine solution and will float against the conveyor. The conveyor 46 is then activated and lifts the shrimp out of the solution. At the top of the conveyor 46, the shrimp can be packed, boxed, or packed in bulk to be taken to the refrigerated storage hold below deck. Alternatively, the shrimp can be spilled off the conveyor 46 into the drop chute 60 and deposited in bulk in the hold.

Figure 3:
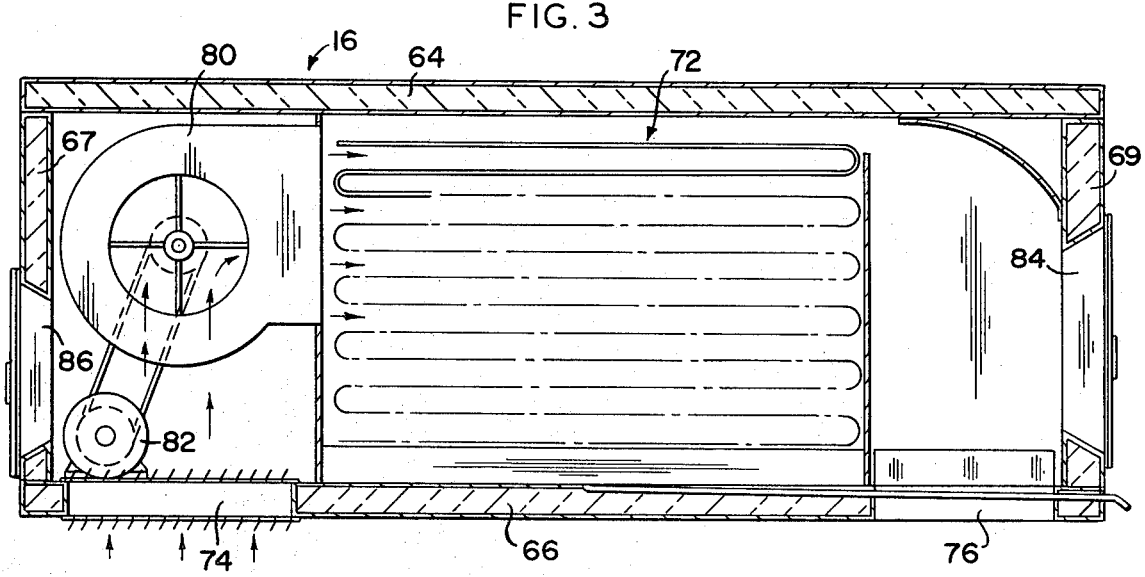
FIG. 3 is a cross-sectional view along line 3–3 of FIG. 2.

The modular quick freeze apparatus 10 is further adapted to refrigerate the cold storage hold of the vessel. For this purpose, module 16 is provided. The module is generally rectangular coil shaped and is provided with a top wall 64, a bottom wall 66 and side walls 67—70 so as to provide an insulated enclosure through which cold air can flow. Within module 16 is affixed a convoluted brine or cooling coil 72 as seen in FIGS. 2 and 3. A pair of openings 74 and 76 are located at each end of bottom wall 66. These openings 74 and 76 provide pneumatic communication either directly or through tubular duct 78 with the cold storage hold. Several louvred openings 20 or doors (not shown) are spaced around the cold air duct 78. FIG. 1 illustrates the arrangement of the duct and louvred openings in frame 12. A blower 80 is mounted over intake opening 74 such that when blower 80 is actuated by motor 82, attached to bottom wall 66, air from the cold storage hold will be drawn up, blown across cooling coils 72 and forced back down into the cold storage hold through exhaust opening 76. The air within the cold storage hold is then constantly circulated and cooled by module 16. A pair of defrosting doors 84 and 86 are provided on side walls 67 and 69 respectively for defrosting cooling coils 72 and the cold storage hold. When the openings 74 and 76 are closed and the defrosting doors 84 and 86 are open, ambient warm air will circulate about the cooling coils 72. When it is desired to defrost the cold storage hold itself, exhaust openings 76 as well as defrosting doors 84 and 86 are uncovered and the blower forces warm air into the cold storage hold.

The cooling plates or coils 50 and the brine coils 72 are coupled to and cooled by a refrigeration module 14, which is generally rectangular shaped and has a top, bottom and four side walls 87—92 respectively. The module contains the engines or motors 94, compressor and condenser units 96 to cool the freezing fluid.

The module units may be constructed of plastic, fiber glass or type 316 stainless steel or other materials with durable welded, bolted or glued seams and joints. The freezing and cooling modules 16 and 18 are insulated with insulation material such as Dow Chemical urethane, 3 inches thick or more. The brine coils 72 are type 316 stainless steel tubing or its equivalent which are ½ or 1 inch outside diameter. All brackets, clamps, surface extenders or other braces also are plastic, metal or type 316 stainless steel and are welded or bolted to the modules 14, 16 and 18 and frame 12. Electrolytic or galvanic action is thereby maintained at nearly a zero reading.

It is also within the contemplation of this invention that various modules 14, 16 and 18 be installed in different locations on the ship instead of all together as illustrated. The module could also be placed together oriented differently from that shown, for instance modules 14 and 16 can be installed end wise or in some other position in order to conserve space on the ship deck.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described:
What is claimed is:

1. An integrated quick freeze refrigeration system comprising a plurality of separate modular components operatively interconnected such that two or more modular components may be selectively integrated to provide systems of various configurations without changing the basic configuration of each individual modular component, said system including a frame on which said modular components are mounted, a first module removably connected to said frame and having at least one blower and cooling coil, an entrance and exit means is said first module whereby pneumatic fluid is urged to circulate about said cooling coil by the action of said blower, a third module removably connected to said frame in operative relation to said first module and comprising a refrigeration means including a refrigeration unit having at least one compressor-motor for lowering the temperature of a coolant circulated therethrough, said coolant from said refrigeration means being transported to said cooling coils of said first module whereby the temperature of said pneumatic fluid is lowered, said frame including duct means arranged thereon in intercommunicating relation between said exit means and an enclosed receiving area, whereby upon actuation of said third module, cooling will take place in said receiving area.

2. An integrated quick freeze refrigeration as in claim 1 further including a second module removably connected to said frame in operative relation to said first and third modules and comprising refrigeration coils, a freeze solution confined within said second module, circulating means for circulating said confined solution about said second module and over said refrigeration coils to cool said solution, unloading means operatively disposed within said second module whereby comestibles placed in said freeze solution are removed from said second module and transported to a remote station and means to operatively connect said first module to said second module such that coolant from said first module is transported to said refrigeration coils whereby the temperature of said freeze solution is lowered.

3. The quick freeze refrigeration system of claim 2 wherein said unloading means comprise an endless conveyer configured to protrude into and lift objects from said freeze solution.

4. The quick freeze refrigeration system of claim 3 wherein said conveyor means may be turned on or off as desired.

5. The quick freeze refrigeration system of claim 2 wherein said second module has grating means which are configured to stop the circulation of an object in said freeze solution but will allow said freeze solution to continue to circulate.

6. The quick freeze refrigeration system of claim 2 wherein the second module is provided with loading means configured to pass freezable objects into said second module.

7. The quick freeze refrigeration system of claim 6 wherein said loading means comprise a hopper extending into said second module, said hopper including shutter means which can be opened and closed to retain said objects therein and said means further functioning to prevent said solution from spilling out of said second module.

8. A quick freeze refrigeration system of claim 2 wherein a module frame is provided which is configured to fit into a communicating wall between two separate areas and further adapted to hold said aforementioned modules in an assembled operational relationship whereby upon actuation of said refrigeration system cooling will take place in one of said separate areas.

9. The quick freeze refrigeration system of claim 1 wherein said entrance and exit means comprise apertures in said first module whereby said blower can draw pneumatic fluid from a given area, circulate said fluid around said coils and expel said now colder fluid back into said given area.

10. The quick freeze refrigeration system of claim 9 wherein said first module is provided with a third aperture communicating with a second, distinct area and, further said third aperture has an openable closure whereby when said third aperture is open ambient pneumatic fluid from said second area will enter said first module.

11. The quick freeze refrigeration system of claim 10 wherein when said openable closure is in the open position, said closure will close one of said other tow apertures whereby warmer ambient air will be drawn in to defrost said refrigeration system.

12. An integrated quick freeze refrigeration system comprising a frame on which modular components are mounted, a first module removably connected to said frame and including at least one blower and cooling coil, entrance and exit apertures in said first module whereby pneumatic fluid may be drawn through said entrance aperture by said blower, forced over said coils and out said exit aperture, a second module removably connected to said frame in operative relation to said first module and comprising refrigeration coils, a pump for circulating a freeze solution over said refrigeration coils, a motorized conveyor extending into said second module configured to convey frozen comestibles to a remote location, means to restrict said circulation of solid particles but allow the passage of said freeze solution, loading hopper on said second module whereby comestibles are loaded into said second module, and a third module removably connected to said frame in cooperative relation to said first and second modules and comprising at least one compressor motor therein for lowering the temperature of a coolant, pipe which operatively connects said first, second and third modules configured to transport said coolant between said modules whereby coolant from said third module will be passed through the respective cooling coil and refrigeration coil, said first and second module respectively and returned to said third module so that the temperature of the freeze solution contained in said second module and the pneumatic fluid of the first module will be lowered.

* * * * *

UNITED STATES PATENT OFFICE
CERTIFICATE OF CORRECTION

Patent No. 3,696,631                                Dated   October 10, 1972

Inventor(s) Pelayo F. Valdes

It is certified that error appears in the above-identified patent and that said Letters Patent are hereby corrected as shown below:

Column 3, line 34, after "motor", insert -- module -- ; line 63, after "for", insert -- a -- . Column 5, line 39, cancel "packed", first occurrence, and insert -- sacked -- . Column 6, line 65, "is" should read -- in -- . Column 8, line 21, "tow" should read -- two -- .

Signed and sealed this 8th day of May 1973.

(SEAL)
Attest:

EDWARD M. FLETCHER, JR.                ROBERT GOTTSCHALK
Attesting Officer                      Commissioner of Patents